Patented Jan. 27, 1948

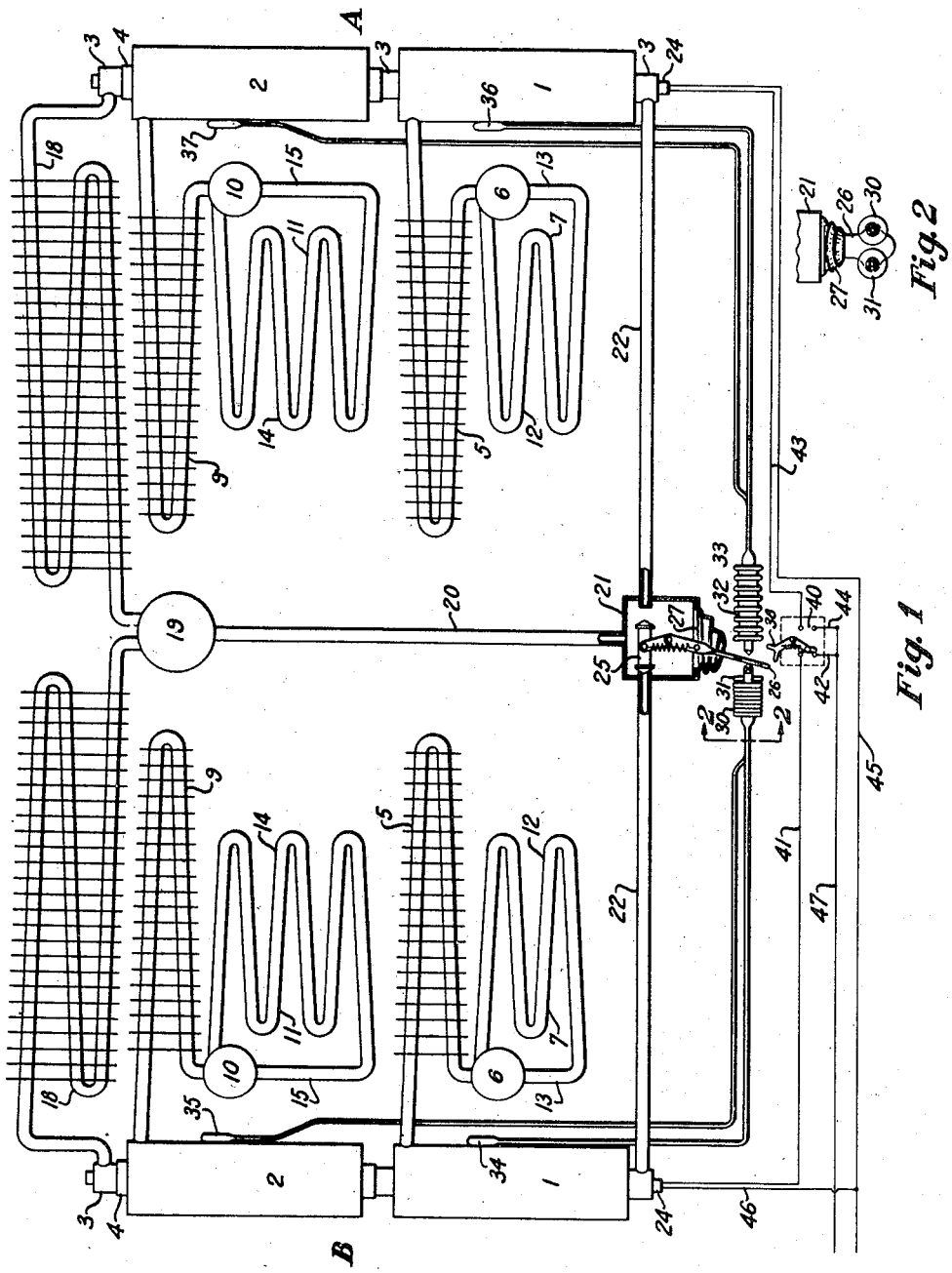

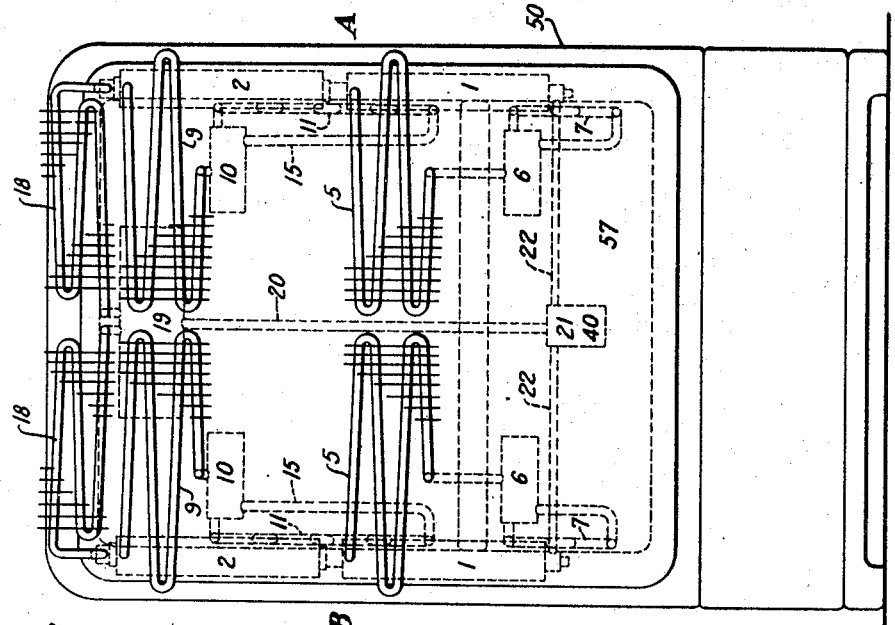
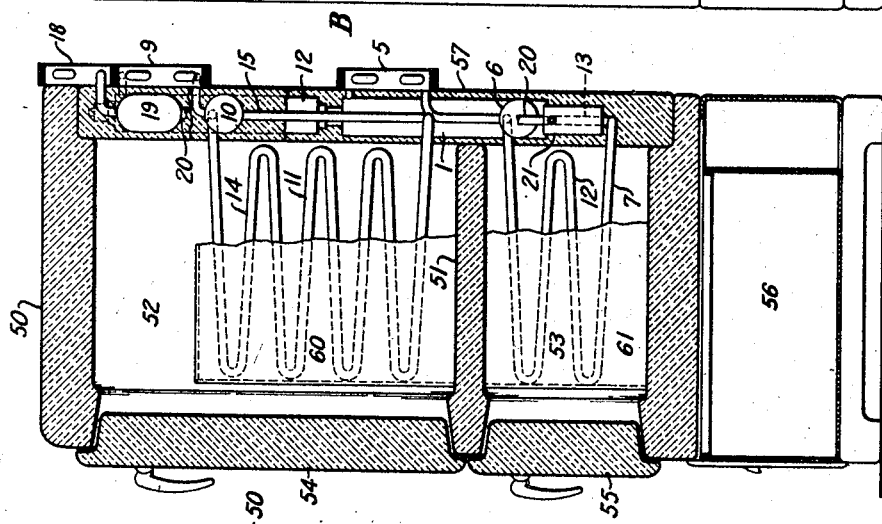
Fig. 4
Fig. 3
Fig. 5
INVENTOR.
Otis B. Sutton

2,435,107

UNITED STATES PATENT OFFICE 2,435,107

TWO TEMPERATURE INTERMITTENT TYPE ABSORPTION REFRIGERATOR

Otis B. Sutton, North Canton, Ohio, assignor to The Hoover Company, North Canton, Ohio, a corporation of Ohio Application March 3, 1943, Serial No. 477,829

17 Claims. (Cl. 62—5)

The present invention relates to the art of refrigeration and more particularly to a refrigerating apparatus and method of the intermittent type especially characterized in that it will produce a refrigerating effect simultaneously at a plurality of distinct temperature levels.

It is a particular object of the invention to provide an intermittent absorption refrigerating apparatus of the type utilizing a plurality of systems to produce a continuous refrigerating effect which is so constructed and arranged that the abstraction of heat from various absorbers or absorption zones is regulated and controlled so as to produce evaporation of the refrigerating medium under selected conditions to produce a plurality of simultaneous refrigerating effects which occur at different temperature levels.

It is a further object of the present invention to provide an intermittent absorption refrigerating apparatus of the type utilizing a plurality of systems to provide a continuous refrigerating effect and in which each system consists of a plurality of simultaneously operated units constructed and arranged to produce a refrigerating effect at different temperature levels.

It is a further object of the invention to provide an intermittent absorption refrigerating apparatus characterized by the provision of a plurality of individual units in which the cooling means for the absorber generators on the cooling cycle are so arranged that cooling of the individual absorber generator units proceeds under different conditions so as to produce different temperature effects in the associated evaporating units.

It is a further object of the present invention to provide an intermittent absorption refrigerating apparatus of the above described type which includes a novel control mechanism.

It is a further object of the present invention to provide an intermittent absorption refrigerating apparatus including a plurality of individual units so constructed and arranged that the cooling medium for one unit will operate to cool the absorber generator to a lower temperature level than the cooling medium for an associated unit will cool its associated absorber generator whereby to produce a refrigerating effect at a plurality of temperature levels.

Other objects and advantages of the invention will become apparent as the description proceeds when taken in connection with the accompanying drawings in which—

Figure 1 is a schematic representation of one form of the invention.

Figure 2 is a detailed view taken along the line 2—2 of Figure 1.

Figure 3 is a side elevational view partly in section illustrating the apparatus of Figure 1 associated with a cabinet of a domestic refrigerating unit.

Figure 4 is a rear elevational view of the apparatus of Figure 3.

Figure 5 is a partial horizontal sectional view of the apparatus of Figure 3.

Figure 6:
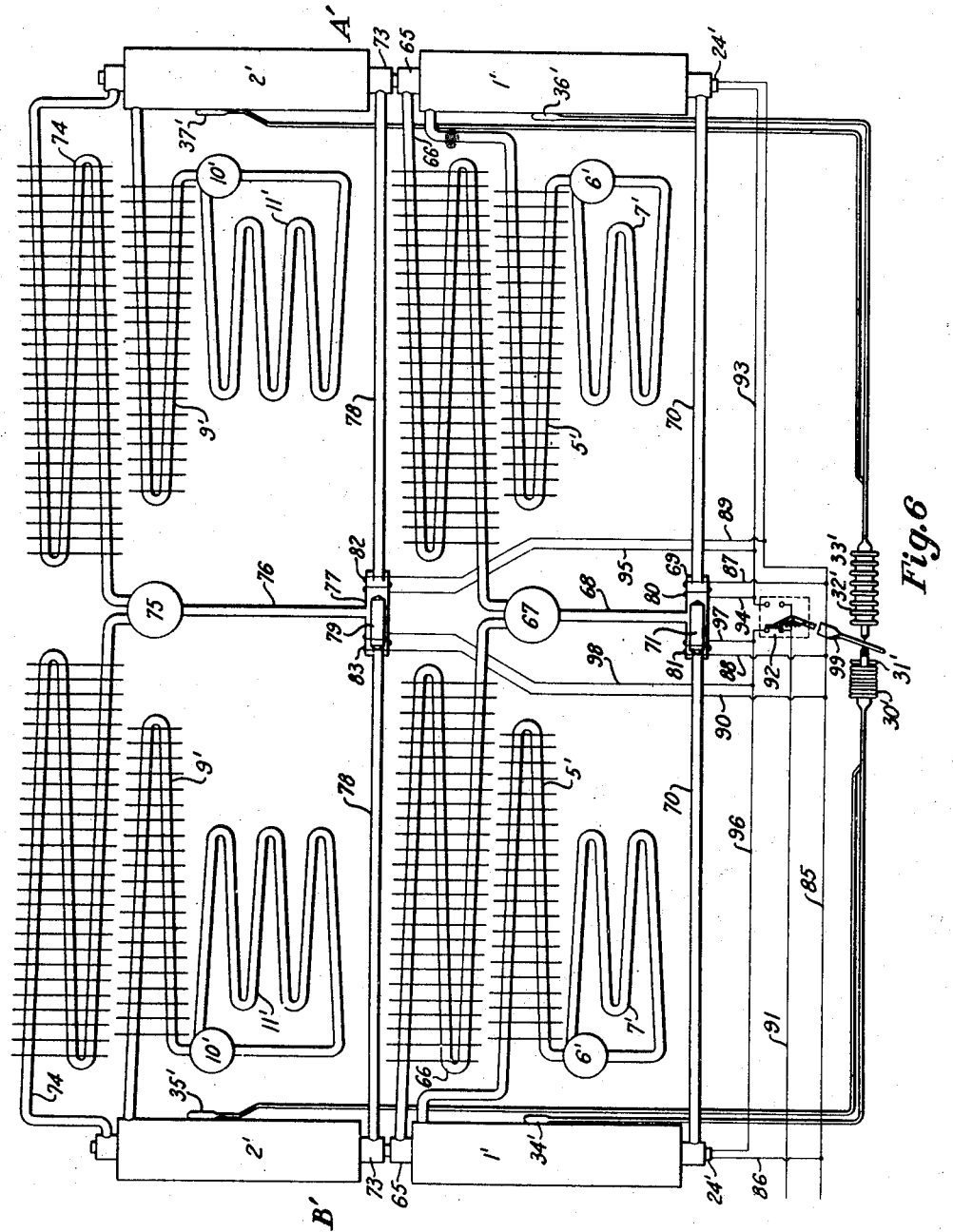
Figure 6 is a diagrammatic representation of a modified form of the invention.

The apparatus illustrated in Figure 1 consists of two identical sets of intermittent absorption refrigerating apparatuses shown at the left and right hand sides of Figure 1. Since the two sets of refrigerating apparatuses are identical, only a single unit will be described in detail but corresponding reference characters will be applied to the corresponding units on the opposite side of the figure.

The set of refrigerating units on the right hand side of the figure will be designated A and the set of units on the left hand side of the diagram B. The set of units A will be described in detail. The apparatus comprises a pair of absorber-generators 1 and 2 which are positioned vertically above one another. Each of these absorber generators is of a known type such as that illustrated and described in British Letters Patent No. 530,061, accepted December 4, 1940, and consists essentially of a central heating flue, a cooling medium duct surrounding the heating flue or channel and a surrounding cylindrical chamber which is charged with an absorbent such as strontium chloride, magnesium chloride, calcium chloride, strontium bromide or similar salts which are capable of absorbing and liberating ammonia when cooled and heated, respectively.

In the illustrated arrangement a hollow cooling fluid duct 3 extends vertically through the absorber-generators 1 and 2. If desired, a layer of insulating material 4 may surround the duct 3 as it passes through the absorber-generator 2 for a purpose to be described hereinafter.

The upper portion of the absorber-generator 1 connects to a tubular air cooled condenser 5 which discharges into a collection chamber 6 for a tubular evaporator 7.

The upper absorber-generator 2 connects to a tubular air-cooled condenser 9 which discharges into a collection chamber 10 for a tubular evaporator 11.

The evaporator 7 consists of a vertically extending coil 12 connected at its upper portion to the upper portion of the vessel 6 and at its lower portion to a vertically extending pipe 13.

The evaporator 11 consists of a vertically extending coil 14 connected at its upper portion to the upper portion of the vessel 10 and at its lower portion to a vertically extending conduit 15 which connects to the bottom portion of the vessel 10.

The duct 3 connects at its upper portion to a tubular air-cooled cooling element 18 which discharges into the upper portion of a reservoir 19. The reservoir 19 connects by means of a conduit 20 with a valve chamber 21. The valve chamber 21 in turn connects to the lower portion of the duct 3 by means of a conduit 22.

In the illustrated embodiment an electrical heating element 24 extends vertically through the central hollow portion of the cooling duct 3.

It will be noted that the portions 19, 20 and 21 of the cooling system are common to the cooling units A and B and are not duplicated as are all other units in the system so far described.

The valve chamber 21 contains a snap acting valve mechanism 25 which is arranged to prevent communication between the conduit 20 and one or the other of the conduits 22 depending upon its position. The valve mechanism 25 is operated by an actuating lever 26 which extends through a flexible sealing diaphragm 27. The actuating lever 26 is positioned between a pair of thermostatic bellows 30 and 31 associated with the cooling unit B and a pair of bellows 32 and 33, not shown, associated with the cooling unit A.

The bellows 30 include a capillary tube and bulb element 34 arranged to respond to the temperature of the element 1. Similarly the bellows 31, 32 and 33 are provided with capillary tubes and bulb elements 35, 36 and 37, respectively, which are arranged to cause the bellows to respond to the temperatures of the element 2 of section B and elements 1 and 2 of section A, respectively.

The projecting end of the actuating lever 26 is also positioned to engage the actuating arm 38 of a two position snap-acting switch mechanism 40. In the position shown the snap-acting switch 40 is arranged to complete the circuit between the conductors 41 and 42 and in its opposite position to complete a circuit between the conductors 43 and 44. The supply conductor 45 connects directly to the heating element 24 of cooling unit A and is directly connected to heating element 24 of cooling unit B by conductor 46. The conductors 41 and 43 are connected to the heating elements 24 of cooling units B and A, respectively. The conductors 42 and 44 are connected to the line conductor 47.

In the operation of this form of the invention and in the position of the control illustrated the circuit will be completed by the switch mechanism 40 between conductors 41 and 47, thus energizing the heating element 24 of cooling unit B. Also the snap-acting valve mechanism in the position shown will prevent supply of cooling medium to conduit 22 of cooling unit B and will allow flow of cooling medium between conduits 20 and 22 to supply cooling medium to duct 3 of cooling unit A. In this position of the parts the application of heat to the absorber-generators 1 and 2 of cooling unit B will cause these elements to liberate refrigerant vapor, preferably ammonia, which will be condensed in condensers 8 and 9 and will collect in the evaporators 7 and 11 and in collecting tanks 8 and 10. This operation will continue until substantially all the absorbed refrigerant has been liberated from the absorbent salt contained in the absorber-generators 1 and 2 at which time the temperature of the elements 1 and 2 will rise rather sharply and one or the other of the bellows 30 or 31 will expand and actuate the snap-acting switch 40 and snap-acting valve 25 to their opposite positions which will thus deenergize the heater 24 of cooling unit B and will discontinue supply of cooling medium to cooling unit A and allow cooling medium to flow into cooling unit B.

During the period when cooling unit B is being heated cooling medium flows into duct 3 of cooling unit A wherein the same is heated and partially or completely vaporized with the result that the vapor and some heated liquid flows into the heat rejecting element 18 associated with the cooling unit A where vapor is condensed and flows back into reservoir 19 for re-circulation through duct 3. The abstraction of heat from the absorber-generators 1 and 2 of cooling unit A causes the enclosed absorbent salt to absorb refrigerant vapor with the result that the refrigerant in the evaporators 7 and 11 progressively vaporizes to produce a refrigerating effect which continues until the collected refrigerant is substantially all absorbed. Shortly after initiation of cooling in the cooling unit A the associated thermostatic bellows 32 and 33 contract so as to allow operation of the snap acting valve and switch by the bellows 30 and 31 when the absorber generators associated therewith reach the temperature for which the bellows element is set.

It will be noted that the cooling medium is supplied first to the absorber generator 1 and then flows through the absorber-generator 2. As a result of this action the absorber-generator 1 is cooled to a greater extent than the absorber-generator 2 so that the vapor pressure of the refrigerant in absorber-generator 1 is lower than the vapor pressure of the refrigerant in the absorber-generator 2. As a direct consequence of this difference in vapor pressures, the evaporator 7 associated with absorber-generator 1 will operate at a temperature lower than the temperature maintained by the evaporator 11 associated with absorber-generator 2. The difference in temperature of the two evaporators will be directly proportional to the difference in vapor pressures or temperatures maintained in the associated absorber-generators. In connection with the absorber-generator 2 the optional layer of insulation 4 will provide a further temperature differential between the absorber-generators 1 and 2 and consequently a further temperature differential between evaporators 7 and 11. This element may be omitted or included as desired depending upon the magnitude of the desired temperature differential.

The cooling system for the absorber-generators will be charged with a secondary cooling medium, such as methyl chloride to an extent sufficient to insure substantial flooding of a major portion of the duct 3. Therefore, upon actuation of the snap-acting valve 25 a relatively large quantity of cold cooling medium will flood into one or the other of the cooling jackets depending upon which set of absorber-generators has just completed a heating cycle and will quickly cool the hot absorber-generators to an absorbing temperature level. In this way the production of refrigeration is not unduly interrupted; that is, the absorber-generators very quickly shift from the generating to the absorbing cycle.

Referring now to Figures 3 to 5, inclusive, the manner in which the refrigerating apparatus of Figure 1 is associated with a domestic refrigerating cabinet is illustrated. As here illustrated there is provided an insulated cabinet 50 interiorly divided by an insulated partition 51 into an upper food storage chamber 52 and a lower ice freezing chamber 53. Suitable insulated doors 54 and 55 are provided to allow access to the chambers 52 and 53, respectively. The cabinet is provided with a suitable slidably mounted removable vegetable drawer 56 in the base portion thereof underlying the chamber 53.

Substantially the entire rear insulated wall 57 of the cabinet 50 is removable and forms a framework for the refrigerating mechanism by which the refrigerating mechanism may be conveniently mounted and tested before assemblage with the cabinet structure proper.

The absorber-generators 1 and 2 of each of the cooling systems are embedded in the insulated panel 57 and are positioned in vertically spaced relationship at opposite sides of the panel 57. Similarly the reservoirs 6, 10 and 19 are embedded in the panel 57. The condensers 5, 9 and 18 are mounted on the rear of the panel 57 closely adjacent thereto so as to be swept by cooling air flowing vertically along the rear wall of the cabinet structure. The evaporator down pipes 13 and 15 are embedded in the insulated panel 57 and the coiled evaporator pipes 12 and 14 extend forwardly thereof into the chambers 53 and 52, respectively.

The high temperature evaporator coils 14 extend into the chamber 52 adjacent the lateral side walls thereof and are thermally bonded to an air cooling and sealing plate 60 which may be supported by the panel 57. Thus the air within the chamber 52 is cooled by the cold plates 60 which are positioned adjacent the opposite lateral side walls thereof. If desired, the coils 14 may lie along the inner face of the panel 57 and be positioned in overlapping relationship behind a plate similar to the plate 60 above described. Furthermore, it is within the scope of the invention to embed the coils 14 in the inner side walls of the cabinet 50 or to allow the same to project into the chamber 52 and to cool the air by suitable cooling fins mounted thereon.

The low temperature evaporator coils 12 extend into the chamber 53 on the opposite side walls thereof and are thermally bonded to cooling plate elements 61 which may also be carried by the panel 57. A suitable shelf or shelves for supporting ice trays will extend between the plates 61 in chamber 53. In a modified arrangement the coils 12 may be placed relatively close together to form the lateral side walls of an ice freezing chamber which will be provided with a plurality of tray supporting shelves in heat conducting relationship with the coil elements 12. In this event the lateral side portions of the chamber 53 will serve as a low temperature food storage area.

The above described form of the invention has been described in connection with electrical heating of the absorber-generators. It is to be understood, however, that a combustible fuel may be utilized in place of the electrical heaters disclosed. In the event that a combustible fuel is utilized the actuating arms 26 of the snap-acting valve will also extend between the opposed shafts of suitable combustible fuel flow control valves which will supply the burners associated with the various absorber-generators. If such construction is used, the central portion of the absorber-generators will be a products of combustion flue and a suitable offtake flue will be provided at the upper portion of panel 57.

Referring now to Figure 6 a modified form of the invention is diagrammatically illustrated. This form of the invention is identical to the form of the invention heretofore described except with respect to the secondary cooling system for the generator absorbers and the control mechanism. Elements of this form of the invention which are identical with that described above in connection with Figures 1 and 2 are given the same reference characters primed.

The absorber-generators 1' are provided with centrally positioned cooling medium passageways 65 which connect at their upper ends to tubular air cooled heat rejecting elements 66. The elements 66 discharge at their lower ends into a reservoir 67 which is connected by means of conduit 68 to a solenoid valve chamber 69. The opposite sides of valve chamber 69 communicate with the lower end of the passageway 65 by means of conduit 70. A magnetic valve element 71 is positioned within the chamber 69 and is arranged to allow the conduit 68 to communicate with only one of the conduits 70 at any one time.

The absorber-generators 2' are each provided with centrally positioned cooling medium passageways 73 which communicate at their upper ends with tubular air cooled heat rejecting elements 74. The cooling elements 74 connect at their lower ends with a reservoir 75 which communicates with a valve chamber 77 by means of conduit 76. The opposite sides of the valve chamber 77 are in communication with the lower ends of the cooling passageways 73 through conduits 78. A magnetic reciprocatory valve element 79 is positioned within the chamber 77 and is arranged to allow communication between only one of the passageways 78 and the conduit 76 at any given time.

As viewed in Figure 6, the right and left hand sides of valve chamber 69 are provided with coil windings 80 and 81, respectively. The valve chamber 77 is similarly provided with right and left hand coil windings 82 and 83, respectively.

An electrical supply conductor 85 is connected directly to heating element 24' of cooling unit A' and is connected to the heating element 24' of cooling unit B' by means of conductor 86. The coil windings 80, 81, 82 and 83 are connected to the supply conductor 85 by means of conductors 87, 88, 89 and 90, respectively. The supply conductor 91 is connected to both lower poles of a two position snap acting double pole switch 92. The upper right hand pole of switch 92 is connected to a conductor 93 which connects directly to the heating element 24' of cooling unit A'. The coil windings 80 and 82 are connected to conductor 93 by conductors 94 and 95, respectively. The upper left hand pole of switch 92, as viewed in Figure 6, is connected directly to the heating element 24' of cooling unit B' by a conductor 96. The coil windings 81 and 83 are connected to conductor 96 by conductors 97 and 98, respectively. The snap-acting switch mechanism 92 is provided with a downwardly extending actuating lever 99 which is positioned to be actuated by the bellows 30', 31', 32' and 33'. It will be understood that the element 99 is actuated in exactly the same manner in which the element 26 is actuated by the bellows 30, 31, 32 and 33 described above in connection with Figure 1.

In this form of the invention the various absorber-generators will be charged with a solid absorbent, such as strontium chloride, strontium bromide, calcium chloride or the like. The various individual intermittent refrigerating apparatuses being four in all, will each be charged with a refrigerant absorbable by the absorbent in the absorber-generator, such as ammonia.

The secondary cooling system for the absorber-generators 1' will preferably be charged with a cooling medium, such as ammonia, and the secondary cooling system for the upper absorber generators 2' will preferably be charged with a cooling medium, such as methyl chloride. By providing separate cooling systems for the absorber-generators on the high and low temperature refrigerating systems, which cooling systems are charged with cooling media having different cooling characteristics the absorber generators will be cooled to different extents, thus they will maintain different refrigerant vapor pressures therein during the absorbing cycle and the associated evaporators will therefore operate at different temperature levels.

In the operation of this form of the invention the expansion and contraction of the thermostats 30', 31', 32' and 33' will shift the actuating lever 99 to one or the other of its two controlling positions. With the actuating lever in the position shown the heating elements associated with the cooling unit B' are energized and the cooling unit B' is thus in the generating cycle. Also the coils 81 and 83 are energized which attract the magnetic valve elements 71 and 79 to the left, as viewed in Figure 6, thus preventing supply of cooling medium to the absorber generators of the cooling unit B'. Cooling medium, however, may flow freely into the cooling jackets of the absorber-generators associated with the cooling unit A' wherefore the cooling unit A' is operating on the refrigerating or absorbing cycle. This condition of affairs will continue until the temperature level of the absorber-generators 1' and 2' of the cooling unit B' reaches the pre-selected value at which time the thermostatic element 30', 31' will actuate the switch into its other position which will de-energize the heaters associated with the cooling unit B', will energize the heating units associated with the cooling unit A' and will shift the magnetic valve elements 71 and 79 to the right, as viewed in Figure 6. This action will shut off flow of cooling medium through the absorber-generators associated with the cooling unit A' and will permit such flow to occur freely through the cooling units associated with the absorber-generators of the cooling unit B'.

It is intended that this form of the invention shall be associated with a cabinet construction in substantially the manner illustrated in connection with the form of the invention illustrated in Figure 1. It will of course be understood that this form of the invention contains two additional air cooled heat rejecting elements which will be positioned directly above the heat rejecting elements 5' on the rear wall of the cabinet structure.

In the operation of this form of the invention the evaporators 7' which are positioned with an absorber-generator having a cooling system charged with ammonia will operate at a low temperature as compared with the temperature which will be maintained by the evaporators 11' which are associated with absorber-generators cooled by a methyl chloride cooling system. Thus, each cooling system is dependent upon air of substantially the same temperature but under these conditions the cooling medium associated with the absorber-generators 1' will maintain those absorber-generators at a temperature below the temperature which will be maintained in the absorber-generators 2'. As a further insurance of maintenance of separate temperature levels the cooling systems associated with the absorber-generators 1' may preferably be designed to operate on a vaporization condensation cycle so that the vapor produced in the cooling jackets 65 will be condensed in the heat rejecting elements 66. The cooling systems associated with the absorber generator 2' may be designed to operate on a thermosyphonic system in which the circulation of the cooling medium will occur due to the temperature differential existing between the cooling medium in the vertically extending jackets 73 which is hot and the cooling medium in the heat rejecting elements 74 and conduit 76 which is cooled.

Figure 7:
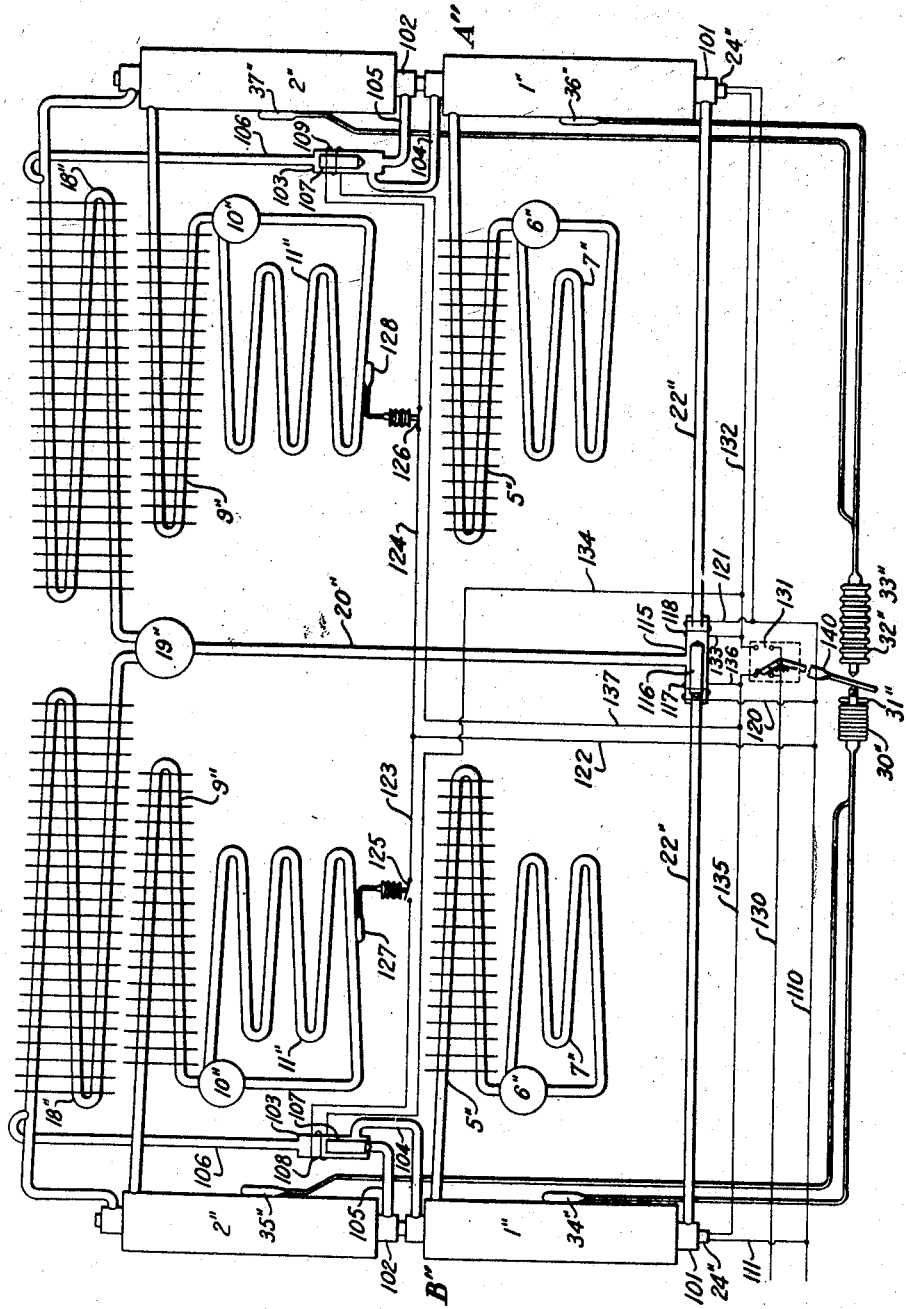
Figure 7 is a diagrammatic representation of a further modification of the invention.

Referring now to Figure 7 there is illustrated a further modification of the invention. This modification of the invention is identical with that illustrated and described in connection with Figure 1 except with respect to certain details of the cooling system for the absorber-generators and the controls. Those portions of the apparatus of Figure 7 which are identical with parts of the apparatus described above in connection with Figure 1 are given the same reference characters distinguished by a double prime.

The absorber-generators 1'' are each provided with a cooling jacket 101 extending through the central portion thereof and surrounding the heating elements 24''. Similarly the absorber-generators 2'' are provided with cooling jackets 102. The cooling jackets 102 are connected at their upper ends to the heat rejecting elements 18''. The upper portion of the cooling jackets 101 communicate with valve chambers 103 by means of conduits 104. The lower portion of the valve chambers 103 communicates, by means of conduits 105, with the lower end of cooling jackets 102 and the upper portion of the valve chambers 103 communicates with the upper portion of the heat rejecting elements 18'' by means of conduit 106 which extends upwardly above the upper part of elements 18'' so that material flowing through conduits 106 will have to rise to a greater height to reach the heat rejecting elements 18'' than the material flowing through the cooling jackets 102.

Reciprocatory magnetic valve elements 107 are mounted in the valve chambers 103 and are arranged when in their lower position to close the entrance to the conduits 105.

A coil winding 108 is wrapped around the exterior of the valve chamber 103 associated with the cooling system unit B''. A coil winding 109 is wrapped around the chamber 103 associated with the cooling unit A''.

In this form of the invention the conduit 20'' discharges into a valve chamber 115 which communicates at its ends with conduits 22''. A reciprocatory valve element 116 is mounted in the chamber 115 and is arranged to prevent communication between chamber 115 and one or the other of the conduits 22'' depending upon the position of the valve elements. Coil windings 117 and 118 are wrapped around the left and right hand sides, respectively, of the chamber 115, as viewed in Figure 7.

An electrical supply conductor 110 is directly connected to the heating element 24" associated with the cooling unit A" and with the cooling unit 24" associated with the cooling element B" by means of conductor 111. The coil windings 117 and 118 are connected to conductor 110 by conductors 120 and 121, respectively. The coil windings 108, 109 are connected to conductor 110 by conductors 122, 123 and 124. The conductors 123 and 124 include switches 125 and 126, respectively, which are actuated by thermostatic mechanisms 127 and 128, respectively. The thermostatic mechanism 127 is arranged to respond to the temperature of the evaporator 11" associated with the cooling units B" and the thermostatic mechanism 128 is arranged to respond to the temperature of the evaporator 11" associated with the cooling units A".

The line conductor 130 is connected to the lower poles of a two position double pole snap acting electrical switch 131. The upper right hand pole, as viewed in Figure 7, of switch 131 is connected to the heating elements 24" of cooling unit A" by conductor 132. Coil windings 118 and 108 are connected to the conductor 132 by conductors 133 and 134, respectively. The upper left hand pole of the switch 131 is connected to the heating elements 24" of cooling unit B" by conductor 135. The coil windings 117 and 109 are connected to the conductor 135 by conductors 136 and 137, respectively.

In the operation of this form of the invention the control mechanism in the position shown will energize the heating elements for the cooling unit B", will energize the coil winding 117 to attract the valve element 116 to the position shown, thus preventing supply of cooling medium to the cooling system B" and allowing supply of secondary cooling medium to the cooling system A". The coil winding 108 will be de-energized by reason of the de-energization of the upper right hand pole of the switch 131 and the coil 109 will be energized by reason of the energization of the upper left hand pole of switch 131. This will allow cooling medium to flow through the cooling jacket 101, conduit 104, valve chamber 103, conduit 105 and cooling jacket 102 to cool the absorbent in the absorber-generators 1" and 2" of cooling unit A" which in turn will produce a refrigerating effect in the associated evaporators 7" and 11", respectively. Should the temperature of the evaporator 11", however, drop below a predetermined value, the thermostat 128 will contract and will open the switch 126 which will de-energize coil 109 and allow the valve element 107 to drop to prevent flow of further cooling medium into the associated absorber-generator 2". When the cooling medium flow is thus discontinued, some absorption in the absorber-generators 2" will continue but at constantly increasing temperatures due to the fact that heat of absorption is not being removed. If the thermostat 128 does not shortly close the circuit in conductor 124, absorption of refrigerant vapor in absorber-generators 2" and evaporation in the evaporator 11" will shortly cease due to the high vapor pressure in the system. Such a condition would occur, however, only in the event that the box cooling or food storage load to be carried by the evaporator 11" is substantially satisfied. The operation of the thermostat 128 and switch 126 is thus substantially to limit the temperature to which the evaporator 11" may drop so as to prevent formation of frost in the food storage chamber and undue cooling of the foodstuffs therein contained.

When the cooling unit B" is in operation the switch 125 and thermostat 127 will function similarly to control the associated valve element 107 to allow or prevent flow of secondary cooling medium through the jacket 102 and thus to limit the temperature of the evaporator 11".

It is well to note at this point that the operation of the valve element 107 does not interfere with the cooling of the absorber-generators 1".

The switch 131 is provided with an actuating lever 140 extending into a position to be operated by the bellows element 30", 31", 32", 33". The bellows element operates the actuating lever 140 in the same manner in which the actuating lever 26 is operated by the apparatus illustrated and described in connection with Figure 1.

This invention provides a refrigerating apparatus of the intermittent absorption type, particularly characterized in that it is adapted to the so-called two-temperature refrigerator cabinets; that is, one in which independent food storage and ice freezing and low temperature refrigerating compartments are provided which are refrigerated by independent evaporating elements and are maintained at different temperature levels. It is further particularly characteristic of the present invention that the cooling units which are positioned in the food storage chamber are not allowed to drop to a temperature low enough to cause formation of frost and that they thereby effectively prevent dehydration of foodstuffs and excessive cooling thereof.

In the present invention various apparatuses and methods are disclosed and described which will achieve this dual refrigerating effect by regulating the vapor pressure in the various generator-absorbers associated with the evaporating elements so as to produce evaporation of the refrigerant in the various evaporators under different pressure and temperature conditions.

While various modifications of the invention have been herein disclosed and described, it is to be understood that various other modifications of the invention are included within the spirit thereof as defined by the appended claims.

I claim:

1. Refrigerating apparatus comprising a plurality of refrigerating units each including a refrigerating part and a heat rejecting part so related to said refrigerating part that the temperature of said refrigerating part is a function of the temperature of said heat rejecting part, each of said refrigerating parts being arranged to refrigerate a space distinct from that refrigerated by the remainder of said refrigerating parts, and means constructed and arranged to maintain a differential between the temperatures of said heat rejecting parts whereby to maintain a temperature differential between said refrigerating parts.

2. Refrigerating apparatus comprising a pair of cooling units, each of said cooling units including a pair of intermittent absorption refrigerating systems each comprising a generator-absorber, a condenser and an evaporator, heating means for the absorber-generators of each of said cooling units, an insulated refrigerator cabinet structure associated with said cooling units having separate chambers receiving individual evaporators of each of said units, and cooling means for the absorber-generators of each of said cooling units constructed and arranged to cool one absorber-generator to a lower temperature than the other absorber-generator.

3. Refrigerating apparatus comprising a pair of cooling units, each of said cooling units including a pair of intermittent absorption refrigerating systems each comprising a generator-absorber, a condenser and an evaporator, cooling means for the absorber-generators of each of said cooling units including a circuit for a cooling medium having a heat rejecting part and heat absorbing part in heat exchange relation with each of said absorber-generators, said cooling medium circuit being arranged to cause the cooling medium to flow through said heat absorbing parts serially whereby one of said absorber-generators is cooled by cooling medium heated by an associated absorber-generator, and control means arranged to control the operation of said heating means and of said cooling means to operate said cooling units alternately on generating and absorbing cycles.

4. Refrigerating apparatus comprising a pair of cooling units, each of said cooling units including a pair of intermittent absorption refrigerating systems each comprising a generator-absorber, a condenser and an evaporator; and cooling means for the absorber-generators of each of said cooling units including a circuit for a cooling medium having a heat rejecting part, a heat absorbing part in heat exchange relation with each of said absorber-generators, means connecting said heat absorbing parts in series to provide series flow of cooling medium through said heat absorbing parts, and means for by-passing cooling medium around the heat absorbing part associated with one of said absorber-generators.

5. Refrigerating apparatus comprising a pair of cooling units, each of said cooling units including a pair of intermittent absorption refrigerating systems each comprising a generator-absorber, a condenser and an evaporator, a cooling system for each of said generator-absorbers comprising a fluid circuit having a heat rejecting part and a heat absorbing part in heat exchange with a generator-absorber, each of said cooling medium circuits being charged with a cooling medium, the cooling medium circuits of the absorber-generators of each cooling unit being charged with cooling mediums having different thermal properties to provide different rates of heat absorption from the absorber-generators of each cooling unit and means arranged to control said cooling systems to cool the generator-absorbers of each cooling unit simultaneously and to cool the generator-absorbers of said cooling units alternately.

6. Refrigerating apparatus comprising an insulated cabinet structure, means separating the interior of said cabinet into a pair of insulated cooling compartments, one insulated wall of said compartment being removable, a refrigerating apparatus constructed and arranged to produce refrigeration at a first temperature level mounted on said wall and including parts embedded in said wall and a chilling part arranged to refrigerate one of said compartments, a second refrigerating apparatus constructed and arranged to produce refrigeration at a second temperature level mounted on said wall and including parts embedded in said wall and a chilling part arranged to refrigerate the other of said compartments.

7. Refrigerating apparatus comprising an insulated cabinet structure having a removable vertical side wall, an intermittent absorption refrigerating apparatus associated with said cabinet structure including an evaporator arranged to refrigerate the interior of said cabinet, a generator-absorber embedded in the insulation of said removable wall of said cabinet, a condenser mounted adjacent said removable wall of said cabinet to be contacted by cooling air, and means connecting said generator-absorber to said condenser and said condenser to said evaporator.

8. Refrigerating apparatus comprising an insulated cabinet structure having a removable vertical side wall, an intermittent absorption refrigerating apparatus associated with said cabinet structure including an evaporator arranged to refrigerate the interior of said cabinet, a generator-absorber embedded in the insulation of said removable wall of said cabinet, a condenser mounted adjacent said removable wall of said cabinet to be contacted by cooling air, and a cooling system for said generator-absorber including a heat rejecting part positioned adjacent said removable wall of said cabinet to be contacted by cooling air.

9. In a refrigerator; a cabinet structure including an insulated chamber and insulating means segregating said chamber into upper and lower compartments, one insulated wall of said cabinet being common to said compartments and removable; refrigerating apparatus associated with said cabinet structure comprising; a pair of low temperature intermittent absorption refrigerating systems including cooling elements arranged to refrigerate the interior of one of said compartments, generator-absorber elements embedded in the insulation of said wall of said cabinet and air-cooled heat rejecting elements positioned adjacent the exterior surface of said wall; and a pair of higher temperature intermittent absorption refrigerating systems including cooling elements arranged to refrigerate the interior of the other of said compartments, generator-absorber elements embedded in the insulation of said wall and air-cooled heat rejecting elements positioned adjacent the exterior face of said wall.

10. In a refrigerator; a cabinet structure including an insulated chamber and insulating means segregating said chamber into upper and lower compartments, one insulated wall of said cabinet being common to said compartments and removable; refrigerating apparatus associated with said cabinet structure comprising; a pair of low temperature intermittent absorption refrigerating systems including cooling elements arranged to refrigerate the interior of one of said compartments, generator-absorber elements embedded in the insulation of said wall of said cabinet and air-cooled heat rejecting elements positioned adjacent the exterior surface of said wall; a pair of higher temperature intermittent absorption refrigerating systems including cooling elements arranged to refrigerate the interior of the other of said compartments, generator-absorber elements embedded in the insulation of said wall and air cooled heat rejecting elements positioned adjacent the exterior face of said wall; and control means arranged to operate the refrigerating systems of each pair alternately on generating and absorbing cycles.

11. Refrigerating apparatus comprising a pair of cooling units, each of said cooling units including a pair of intermittent absorption refrigerating systems each comprising a generator-absorber, a condenser and an evaporator, heating means for said generator-absorbers, cooling means for said generator-absorbers constructed and arranged to cool one generator-absorber of each unit to a lower temperature than the other generator-absorber thereof, and control means for regulating the operation of said heating means and said cooling means to operate each of said cooling units alternately on generating and absorbing cycles.

12. Refrigerating apparatus comprising a pair of cooling units, each of said cooling units including a pair of intermittent absorption refrigerating systems each comprising a generator-absorber, a condenser and an evaporator, and cooling means for the absorber-generators of each of said cooling units including a circuit for a cooling medium having a heat rejecting part, a heat absorbing part in heat exchange relation with each of said absorber-generators, means connecting said heat absorbing parts in series to provide series flow of cooling medium through said heat absorbing parts, and means responsive to a condition of one of said evaporators for by-passing cooling medium around the heat absorbing part of the generator-absorber of the refrigerating system including said one evaporator.

13. In a refrigerating apparatus including a plurality of intermittent absorption refrigerating systems for producing refrigerating effects at different temperature levels, each of said intermittent refrigerating systems including a generator-absorber, a condenser and an evaporator connected in circuit, means for heating said generator-absorbers, means for cooling said generator-absorbers, governing means regulating the operation of said heating and cooling means to operate said systems alternately on absorbing and generating cycles in phase relationship with each other; said cooling means including heat absorbing parts in heat exchange relationship with each of said generator-absorbers, a heat rejecting part, and means connecting said heat absorbing parts and said heat rejecting part for series flow of a cooling medium whereby at least one of said generator-absorbers receives cooling medium previously heated by passage through another of said generator-absorbers.

14. In a refrigerating apparatus including a plurality of intermittent absorption refrigerating systems for producing refrigerating effects at different temperature levels, each of said intermittent refrigerating systems including a generator-absorber, a condenser and an evaporator connected in circuit, means for heating said generator-absorbers, means for cooling said generator-absorbers, governing means regulating the operation of said heating and cooling means to operate said systems alternately on absorbing and generating cycles in phase relationship with each other; said cooling means including heat absorbing parts in heat exchange relationship with each of said generator-absorbers, a heat rejecting part, means connecting said heat absorbing part and said heat rejecting parts for series flow of a cooling medium whereby at least one of said generator-absorbers receives cooling medium previously heated by passage through another of said generator-absorbers, and means for by-passing cooling medium around the heat absorbing part of one of said generator-absorbers in response to a predetermined condition of one of said evaporators.

15. Refrigerating apparatus comprising an insulated compartment having a plurality of chambers to be refrigerated at different temperature levels, an evaporator arranged to refrigerate each of said chambers, a plurality of separate intermittent absorption refrigerating apparatuses each including a generator-absorber, one of said evaporators, and a condenser, means for heating said generator-absorbers, separate means for cooling each of said generator-absorbers, control means constructed and arranged to operate said refrigerating systems alternately on generating and absorbing cycles; each of said cooling means including a heat absorbing part in heat exchange relationship with its associated generator-absorber and a heat rejecting part connected to said heat absorbing part for flow of a cooling medium therebetween, the cooling means for the separate generator-absorbers being charged with cooling medium having different thermal properties whereby said compartments are refrigerated at different temperature levels.

16. In a refrigerator, a cabinet structure including two refrigerated spaces insulated from each other, a refrigerating apparatus associated with said cabinet structure including a pair of refrigerating systems, each of said refrigerating systems comprising an absorber-generator, a condenser, and an evaporator connected for flow of refrigerant therebetween, the evaporator of one of said refrigerating systems being arranged to refrigerate one of said spaces and the evaporator of the other of said systems being arranged to refrigerate the other of said spaces, means for heating each of said generator-absorbers simultaneously and in in-phase relationship, means for cooling said generator-absorbers to different temperature levels simultaneously and in in-phase relationship, and means for operating said heating means and said cooling means alternately to produce alternate generating and absorbing cycles.

17. In a refrigerator, a cabinet structure including two refrigerated spaces insulated from each other, a refrigerating apparatus associated with said cabinet structure including a pair of cooling units, each of said cooling units comprising a pair of refrigerating systems, each of said refrigerating systems comprising, an absorber-generator, a condenser, and an evaporator connected for flow of refrigerant fluid therebetween, each cooling unit having an evaporator of one of its component refrigerating systems arranged to refrigerate one of said spaces and the evaporator of the other of its component refrigerating systems arranged to refrigerate the other of said spaces, means for heating said absorber-generators, cooling means for the absorber-generators of each of said cooling units arranged to cool the absorber-generator connected with the evaporators which refrigerate said one space to a lower temperature than the absorber-generators connected with the evaporators which refrigerate the other of said spaces, and control means for controlling the operation of said heating and cooling means to heat and cool the absorber-generators of each cooling unit alternately and in time delayed relationship to the heating and cooling of the absorber-generators of the other cooling unit.

OTIS B. SUTTON.

REFERENCES CITED

The following references are of record in the file of this patent:

UNITED STATES PATENTS

| Number | Name | Date |
|---|---|---|
| 1,506,531 | Kasley | Aug. 26, 1924 |
| 2,008,333 | Nesselmann | July 16, 1935 |
| 2,044,951 | Munters | June 23, 1936 |
| 2,063,292 | Bergholm | Dec. 8, 1936 |
| 2,087,939 | Sarnmark | July 27, 1937 |
| 2,276,948 | Kleen | Mar. 17, 1942 |
| 2,353,714 | Kleen | July 18, 1944 |
| 2,377,332 | Kleen | June 5, 1945 |